Figure 13:
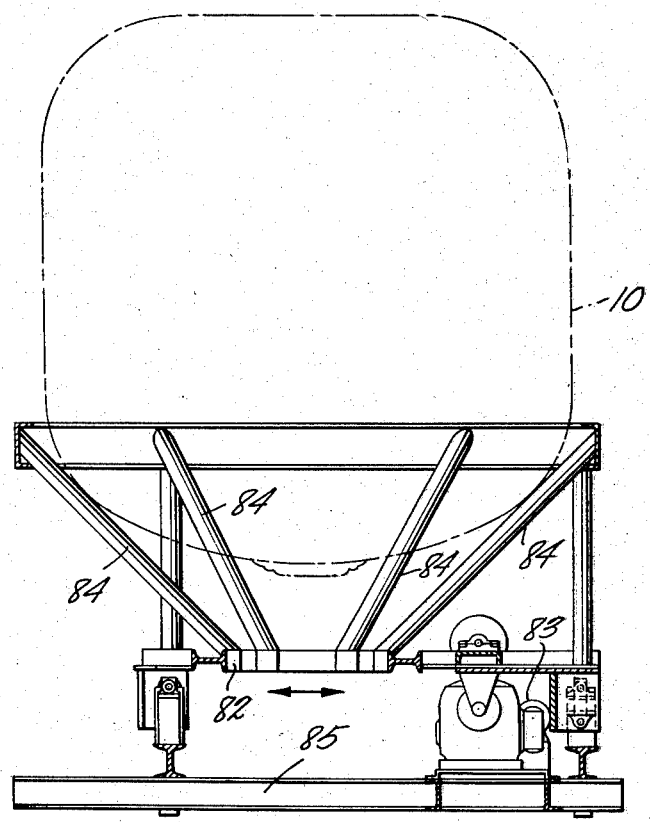

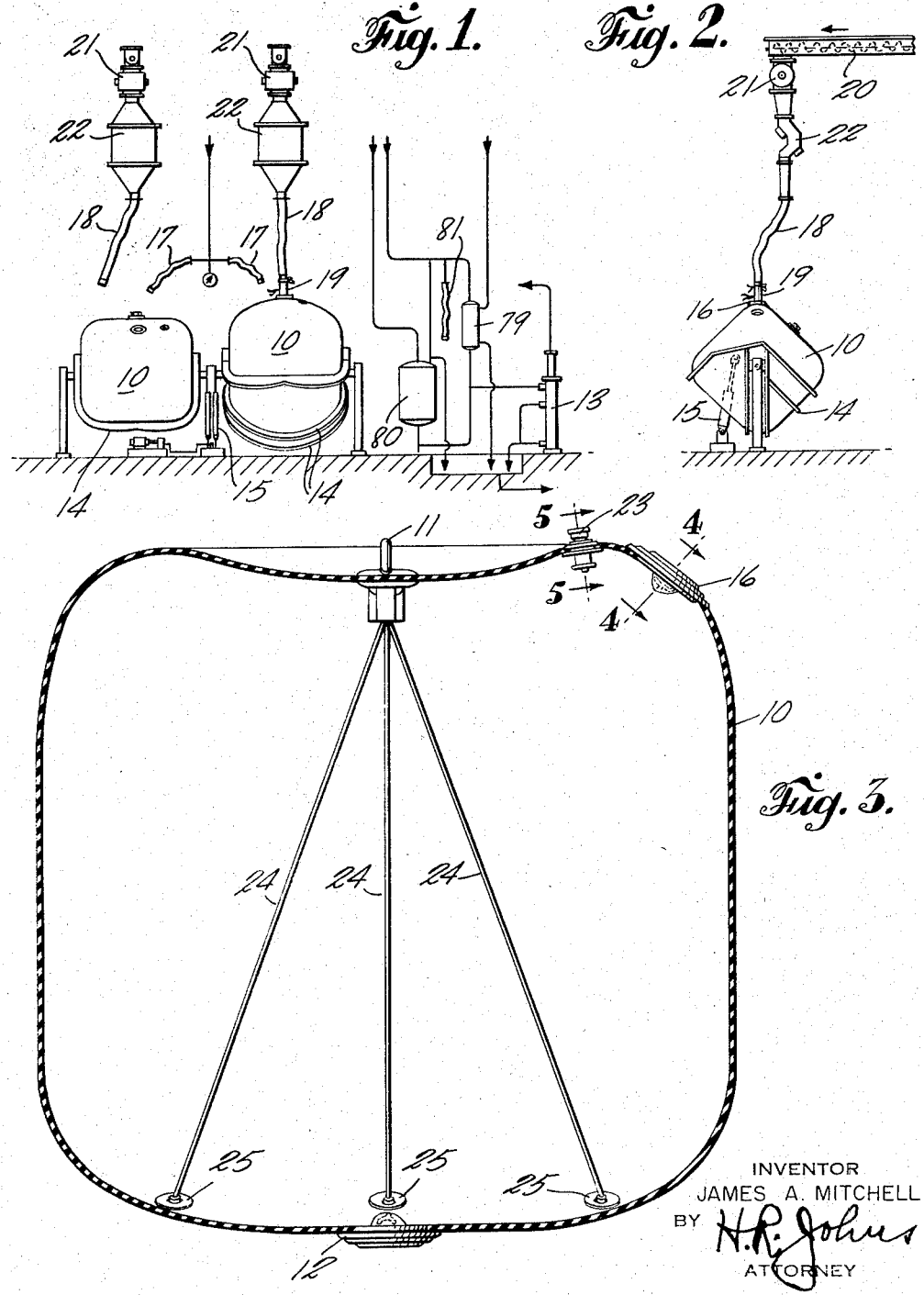

March 3, 1959 J. A. MITCHELL 2,875,562
METHOD OF AND APPARATUS FOR FILLING AND
EMPTYING COLLAPSIBLE CONTAINERS
Filed Dec. 14, 1954 5 Sheets-Sheet 2
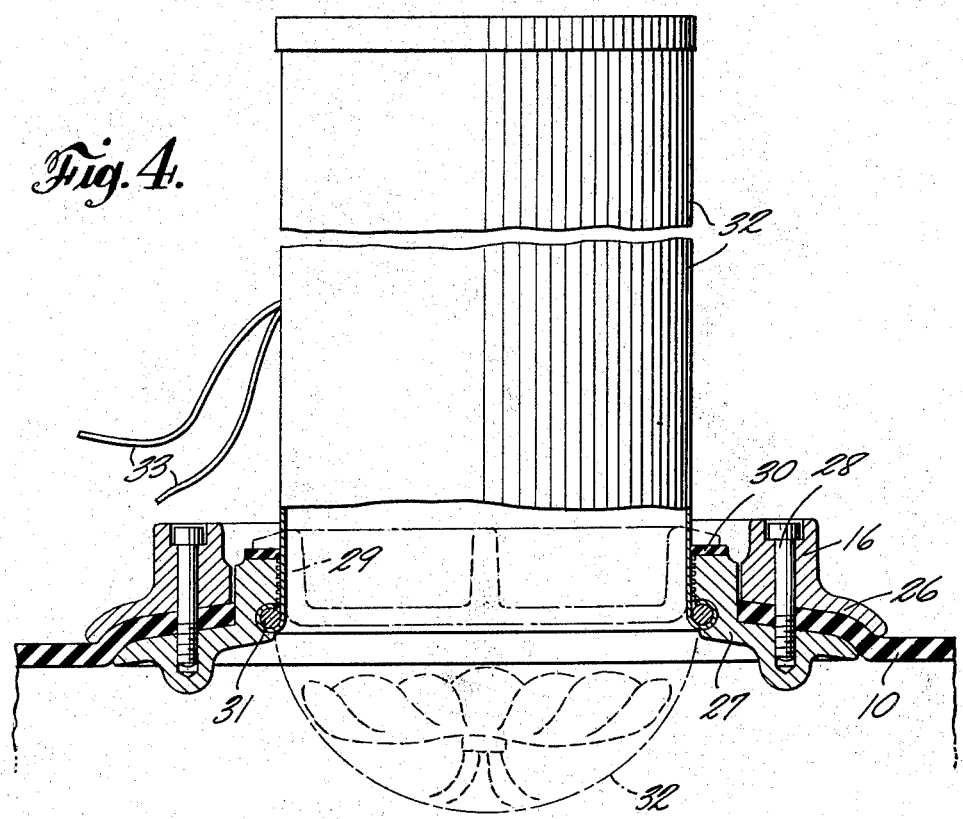
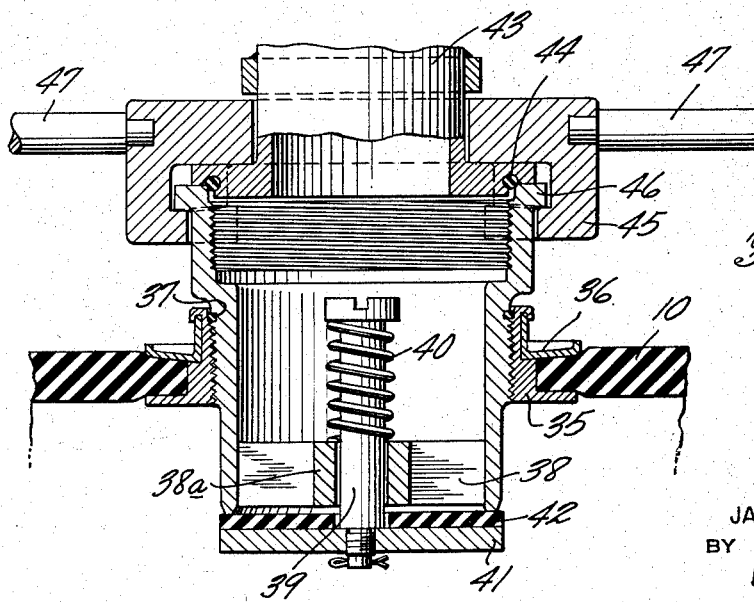
INVENTOR
JAMES A. MITCHELL
BY
ATTORNEY

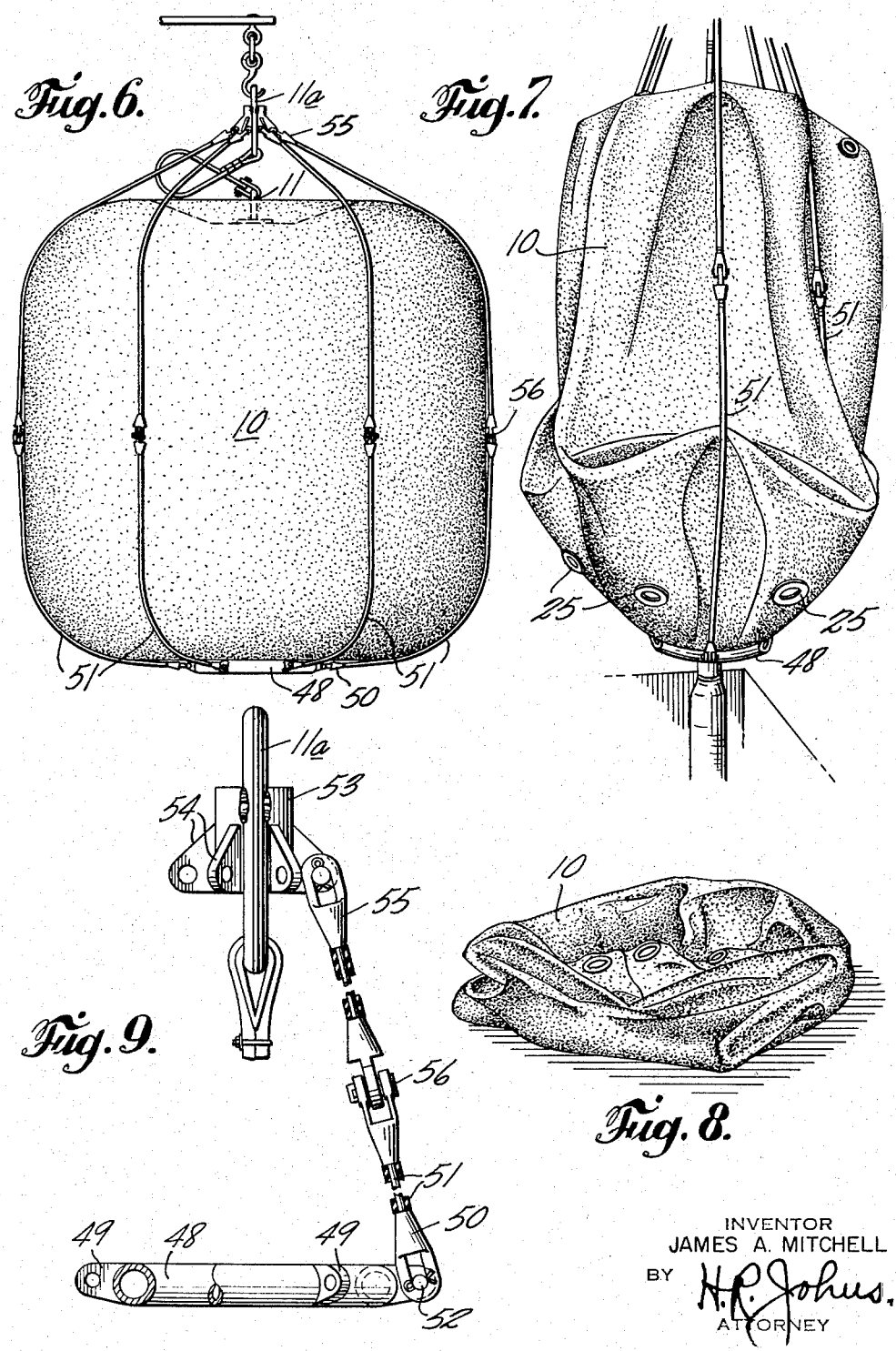

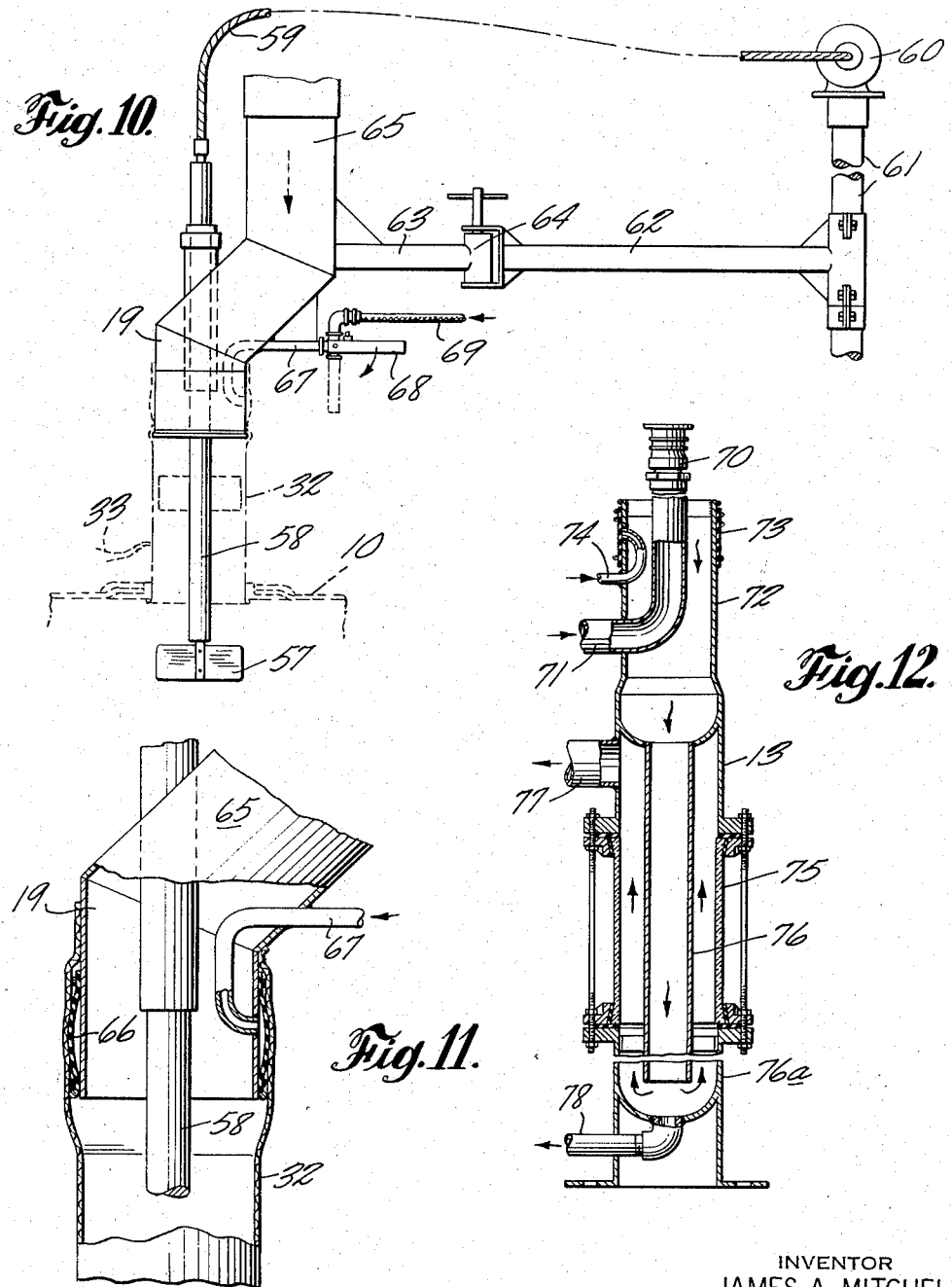

March 3, 1959

J. A. MITCHELL 2,875,562

METHOD OF AND APPARATUS FOR FILLING AND
EMPTYING COLLAPSIBLE CONTAINERS

Filed Dec. 14, 1954

5 Sheets-Sheet 5

INVENTOR
JAMES A. MITCHELL
BY
ATTORNEY

United States Patent Office 2,875,562
Patented Mar. 3, 1959

2,875,562

METHOD OF AND APPARATUS FOR FILLING AND EMPTYING COLLAPSIBLE CONTAINERS

James A. Mitchell, South Charleston, W. Va., assignor to Union Carbide Corporation, a corporation of New York Application December 14, 1954, Serial No. 475,183

13 Claims. (Cl. 53—22)

This invention relates to a process of and apparatus for handling and shipping materials likely to be contaminated by fly ash and dust particles in the air or materials which are likely to be objectionable or a hazard.

One object is to provide a method of and apparatus for reducing such danger of contamination. A further object is to reduce any explosive or other hazard. Another object is to simplify and reduce the expense of handling and shipping such material especially in granular form. A further object is to provide such a method of and apparatus for handling and transporting material to lessen loss especially in handling such resins as polyethylene and polyvinylchloride.

For about a decade the handling and shipping of a resin such as polyethylene has presented a difficult problem. One reason is the danger of it being contaminated by fly ash and dust particles in the air. Some regard that danger as being more acute than is the danger of contamination with food products. Small particles of foreign matter in a thin translucent polyethylene coating are objectionable and become conspicuous. Other resins having the danger of being contaminated but to a lesser extent include polyvinylchloride, polystyrene, phenolic molding powders, and other materials. The immediately prior method of shipment for polyethylene has been in kraft paper bags coated on the inside with a layer of polyethylene to reduce the danger of bits of fiber coming off the paper and getting into the material. When such bags are open or while being tied, there is danger of the material being contaminated from the air and from fibers off of the string used for tying the bag. Some breakage of the paper bags and loss of much of the resin therein has seemed to be inevitable. Other types of containers have been considered unsuitable. Ferrous metal containers are open to some of the same objections and are also in danger of contaminating this resin from particles of rust that may flake off. Non-rusting alloy containers have been considered but these are usually too expensive and not always adapted to be gas tight. Fibrous containers made of cardboard, paperboard, wall board or the like are not mechanically strong if reasonably priced and are open to some of the same objections mentioned above for the paper bags.

Another container given consideration has been the laminated collapsible rubber container made according to the patents of Cunningham, 2,612,924 and 2,613,169, both dated October 7, 1952. These were found to be unsuitable in the initial stage of development for a number of reasons. First, the container had no sleeve valves for permitting it to be used in a completely enclosed solid materials handling system. Secondly, the container size as proposed by Cunningham was too large to permit shipment by truck methods. Thirdly, while the container did contain a gas check valve similar to tire valve construction, it was found unsuitable in that it did not permit inflation of the container in any but its completely closed stage. Fourthly, the initial container proposed was manufactured of "neoprene" lining with tire rubber carcass. This construction was not felt suitable due to migration of contaminants through the "neoprene" liner. In conclusion, therefore, the Cunningham type container, as manufactured by the U. S. Rubber Company, contained no provisions to permit use in closed system handling and was of such construction that it did not fully eliminate potential contaminants.

When such rubber bag type container is being filled with material through a top filling opening, any nitrogen or other inert gas used to inflate the container becomes mixed with air unless the inert gas fills the room in which the filling operation takes place or unless such gas is fed into the container with the material from its storage bins and conveyors. The idea of the filling room containing nitrogen was dismissed because a human operator is needed to take care of normal operation and of emergencies that may develop. The second expedient of having inert gas supplied with the material through the same supply line was believed unsuitable because of the danger of leaks developing in a wide area of hermetically sealed storage bins, conveyors, valves, and the like. Such a leak is objectionable both from the safety standpoint as well as an economic one because the greater the danger of leakage, the greater is the danger that air may get into the sealed area and increase the explosive hazard. Polyethylene when freshly made gives off ethylene gas constituting an explosive hazard when mixed with an oxidizing gas. Having an inert gas supplied with the filling material required two sources of inert gas in event a higher pressure is desired in the container after it has been filled than is provided during filling, and for inflation before filling.

According to this invention the contamination and the explosive hazards have been minimized and resin loss has been greatly reduced. Moving a gas check valve to a location independent of the closure for the filling opening enables an excess of inert gas to be supplied to the container before, or during, and after the filling takes place. Enlarging the size of this valve has shortened the time for inflation. A gas impervious sleeve secured to a metal ring around each of the filling and emptying openings, is tied or clamped near such ring to retain gas pressure and material in the container after a gas-tight closure has been removed and before a gas-tight connection has been made to a filling or emptying pipe with the aid of an outer end portion of such sleeve. A rotating vane is placed within the container during filling to distribute or throw the resin particles against the side walls. When the material being supplied to the container reaches a level as high as that of the rotating vane or paddle, it impedes movement of the vane, causing an overload circuit breaker to stop the supply of material and the vane rotation. This vane can then be withdrawn with the aid of said sleeve from the container without loss of much of the gas pressure.

Figure 14:
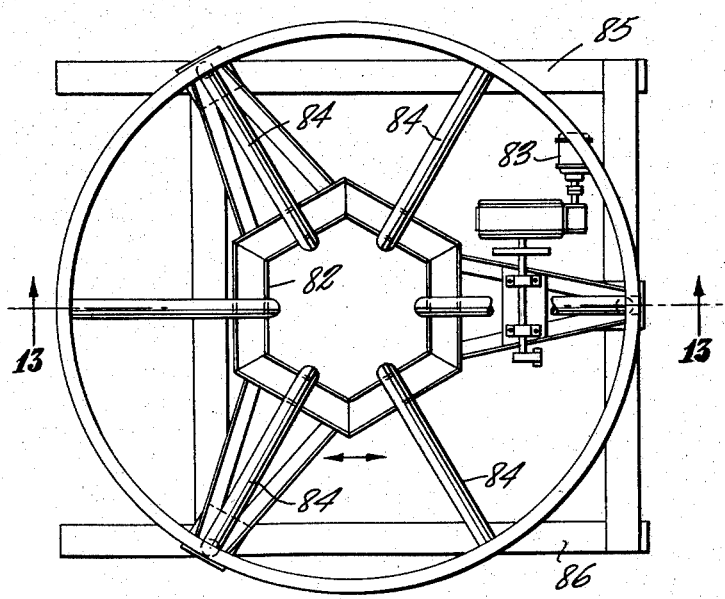

Referring to the drawings:

Fig. 1 is a diagrammatical representation of apparatus for washing and filling collapsible containers under this invention, Fig. 2 is a side view of a collapsible container mounted in a tilting cradle during the filling operation, Fig. 3 is a section through a preferred form of collapsible container employed in the process and apparatus of this invention, Fig. 4 is a section on the line 4—4 of Fig. 3, Fig. 5 is a section on the line 5—5 on Fig. 3, Fig. 6 shows the sling used for holding the container while being emptied, Fig. 7 shows the container in nearly collapsed condition, Fig. 8 shows the container in substantially completely collapsed condition;

Fig. 9 is a detail of the cable connections at the top and bottom of the sling device of Fig. 6, Fig. 10 illustrates the resin disperser for distributing material being supplied through the filling pipe into the container, Fig. 11 is a detail showing the expansible lower end of the filling pipe capable of holding the upper end of a flexible sleeve or other connection between the container and filling pipe, Fig. 12 is a longitudinal section through the washing fixture 13 shown in Fig. 1, Fig. 13 is a side view of a vibrating support used in another way of emptying the container, Fig. 14 is a top plan view of the device of Fig. 13.

A collapsible container 10 is of the general type illustrated in the patent to Cunningham, 2,612,924, dated October 7, 1952, except for certain hereinafter mentioned details. This container preferably contains no natural rubber but is formed from layers of fabric between layers of chemical rubber or layers of other flexible plastics. When filled this container will hold about 296 cu. ft. of granular polyethylene. Its side walls are about one-quarter of an inch thick and the container will expand to a diameter of about 89 inches or for about 3% to 5% increase in volume. When filled it will hold about 11,000 pounds of polyethylene. At the top of the container is an appropriate hook or supporting eye 11 by means of which the filled container may be suspended from above by a crane or lifting truck in handling it. At the lower central part of the container is a discharge opening 12. As shown in Fig. 1 a washing fixture 13 is located adjacent and to one side of a pair of tilting cradles 14. By means of hydraulic or pneumatic mechanism 15 the cradle and container may be swung about the cradle trunnions illustrated in Fig. 1 to bring the filling opening 16 uppermost as shown in Fig. 2. A flexible connection 17 permits the supply of inert gas for inflating and for supplying such gas during or after filling the container. A supply passageway or filling pipe 18 is provided at its lower end portion 19 with a generally rigid fitting for connection with the filling opening as hereinafter described. Granular polyethylene of the size of about 3/16 of an inch cube with rounded corners is supplied from storage bins or other equipment by the screw conveyor 20 shown in Fig. 2. A rotatable feeder valve sometimes called an air lock or rotatable gate valve 21 enables small batches of the material to be fed into the supply line and container without allowing substantial escape of gas pressure from within the container 10. A magnetic separator 22 is provided to extract any ferrous particles that may have flaked off from any storage bin or previous handling equipment. Adjacent to but displaced slightly from the filling opening 16 is a gas check valve 23 somewhat similar in function to an ordinary tire valve but made larger in diameter or about an inch and a half in diameter to enable the inflation operation to be performed more quickly than would be possible with any tire valve known. With such a gas check valve it is possible to inflate and expand this collapsed container from its collapsed condition in about a minute using preferably an inert gas such as nitrogen under a low pressure of about one or two pounds per square inch. Within the container 10 are supporting cables 24 extending between the fitting 11 and bottom portions of the container thus enabling the load to be distributed over the bottom area. Surrounding each place of attachment of a supporting cable 24 is a metal reinforcement 25.

As shown in Fig. 4 the filling opening 16 has a metal ring 26 surrounding it and clamping edge portions of the opening in container 10 between the ring 26 and a cooperative inner ring 27. Bolts 28 secure these rings 27 and 26 clamped together with material of the container 10 between them. The inner ring 27 extends upwardly to provide a seat for the outward flange of the closure or cap 29 with a gasket 30 between this flange and ring 27. An expansible spring ring 31 holds the inner end portion of a flexible substantially gas-impervious nylon sleeve 32 in place. Intermediate the outer or upper end of the sleeve 32 and lower end of the sleeve 32 are draw string ends 33. Normally, the sleeve 32 is carried in the container 10 with the draw string 33 closing the sleeve against the escape of gas. It is the fact that the draw string 33 is located close to the container that enables the draw string when closed and the closure 29 is in place to support the rest of the sleeve 32 as shown in dotted lines in the lower part of Fig. 4. Instead of a draw string 33 a clamp or other removable means for closing the sleeve 32 may be used to prevent substantial escape of gas from the container while the sealing cover 29 is not in place over the filling opening. The sleeve 32 is preferably provided with a thin soft plastic surface to enable the gathering or clamping of the sleeve to be substantially gas-tight. When closure 29 is removed the sleeve 32 may be extended outwardly through the filling opening.

The portion of the sleeve 32 above the draw string 33 in Fig. 4 is placed around the lower end of the supply line 18 and a draw string may be located adjacent the top of the sleeve, and may be tightened and tied to keep gas within the container from escaping. After the upper or outer end of the sleeve is gas-tightly secured the lower draw string is then untied. Instead of a draw string at the outer end, sleeve 32 preferably makes a gas-tight joint with the fitting 19 by means of an outwardly expansible band as shown in Figs. 10 and 11 and hereinafter described. Neither the sleeve 32 nor its draw string needs to be absolutely gas-tight as a small leak is not objectionable.

The gas check valve is shown in Fig. 5 as being provided with a clamping ring 35 and a second clamping ring 36 between which the adjacent edge of the material of the container 10 is securely held in place. An appropriate packing strip 37 prevents gas leakage from the container outwardly around the threaded portion of ring 35. Radial vanes 38 support a guide bearing 38a for the stem 39 and the spring 40 biases the movable valve element 41 with a yieldable seat material 42 to a closed position. The gas supply line 17 is provided with a metal fitting 43 on its end portion having a flange containing a packing ring 44 so that on attachment to the container gas check valve a gas-tight connection is made. At its outer end this gas check valve has a segmental outwardly directed flange 46 beneath which the segmental clamping ring 45 is held. The ring 45 and flange 46 are shaped in a customary manner so that upon angular displacement of one with respect to the other it is possible to separate quickly the clamping ring from the gas check valve. Projecting handle portions 47 provide a convenient grip by means of which the clamping ring 45 may be rotated in attaching the same to the gas check valve 23 and its flange 46.

A discharge sling includes a supporting ring 48 around the discharge opening 12 in the bottom of the container 10 from which diverge projections 49 of the shape illustrated in Fig. 9 for the attachment of cable connection 50 thereto so that cables 51 may extend around the outside of the container at angularly spaced positions as shown in Fig. 6 during a discharge operation. Pins 52 hold the terminal connections 50 to the projections 49. Also shown in Fig. 9 is an upper fitting 53 welded or otherwise secured to the supporting eye 11a or hook having the same number of projections 54 as does the lower ring. Here again upper terminal connections 55 are held to the projections 54 by pins not numbered. With the bottom ring 48 in position on a suitable support and the lower cable portions 51 diverging therefrom, a filled container is placed in substantially axial alignment with the ring 48. The upper fitting 53 and the upper cable portions are then placed over the top of the container. Pins 56 then connect each upper cable portion with its corresponding lower cable portion. When the cable portions are all connected the entire apparatus constitutes a sling by means of which the filled container may be raised while suspended from above. The discharge opening 12 is similar to the filling opening in being provided with a gas sealing closure, and a sleeve to retain gas pressure before a connection is made to a discharge line. Upon removing the cover from the discharge opening 12 in the lower portion of the container, the spaced supporting cables effect a squeezing action upon the filled container tending to form flutes or grooves in the sides of the container facilitating the discharge of material from the suspended container. The partially collapsed container is shown in Fig. 7 while Fig. 8 shows the container in substantially completely collapsed position in which it occupies only about 12% of the space it occupies when inflated.

In Fig. 10 is shown a resin disperser comprising rotatable vanes 57 mounted within the container 10 on the lower end of a rotatable shaft 58 driven by the flexible drive shaft 59 from a motor 60. The supporting column 61 on which the motor is mounted is adjacent two or more container filling positions. Cantilever supporting arm 62 has its outer portion 63 pivoted at 64 in order that the arm 63 may be swung from one filling position to another. The arm portions 62 and 63 are not usually in alignment whereby the supply line 65 may be adjusted in a direction normal to the plane of the paper as well as radially toward or from the column 61. The shaft 58 is shiftable in order that the rotatable vanes 57 may be raised from a position within the container to a position outside of it as shown in dotted lines in Fig. 10. The bearing for the shaft 58 where it passes through a supply line 65 permits the shaft 58 to be slidable therethrough when not rotating. A pin through shaft 58 suffices to hold the vanes 57 in their upper position. Supply line 65 leads from any source of material such as a storage bin or conveyor into a location above a container to be filled so that a sleeve 32 may be attached to the lower end of the supply line 65 with a substantially gas-tight connection. In Figs. 10 and 11 instead of tying the upper end of the sleeve 32 to the lower end of the supply line 65, the lower end of the supply line is provided on its outer surface with an expansible band 66 to make a gas-tight connection with the sleeve 32. Gas under pressure is supplied through the pipe 67 to the inner surface of the expansible band 66 and as pressure is applied the band 66 bulges radially outward into a tight contact with the inner surface of the sleeve 32. The gas line 67 is provided with a valve having a control handle 68 and is supplied through a pressure line 69 from any convenient source of gas under pressure.

The washing fixture 13 shown in Fig. 12 comprises a fog type spray nozzle 70 supplied by the pipe 71 from a surge tank 80 or other source of liquid pressure. The purpose of the tank 80 is to provide an adequate supply of washing water under about 50 or 60 pounds per square inch in sufficient quantity for the entire washing operation. Around the nozzle 70 is a drain pipe 72. It is expected that the use of this washing fixture will be required only when the container content is changed from one type of material to another. For instance, care is used to see that polyethylene of one kind is not mixed with the same material of another kind or molecular weight. In use it is expected that an inflated empty container 10 will be suspended over the washing fixture 13 and upon removal of the cover from the discharge opening of the container 10, the clamping ring around the discharge opening or a sleeve will fit over the upper end of the drain pipe 72. It will be understood, as stated previously, that the discharge opening is of substantially the same size and construction as is that shown for the filling opening. After the outer ring around the discharge opening or a sleeve has been placed over the drain pipe 72, gas under pressure is admitted through the pipe 74 to extend the flexible band 73 outwardly into substantially water and gas-tight contact with the clamping ring or sleeve from around the discharge opening. The outer tube is provided with a sight glass for determining the condition of the discharge drain water; this outer wall around the inner pipe 76 is of glass as shown at 75. Drain water follows the direction of the arrows in Fig. 12 and moves upwardly within the glass wall 75 and outside the pipe 76 to the water discharge pipe 77. The bottom of the washing fixture is provided with a drainage pipe 78 connected to the base 76a thereof. A turbulent flow is planned in the inner tube 76 and a laminar flow in the outer passage between the glass 75 and the inner pipe 76 in order that the condition of the liquid and any suspended matter may be visible. After washing the inside of an inflated container, water is turned off and heated air supplied through the pipe 71 from a heater unit or exchanger 79 (Fig. 1) to dry out the inside of the container by a blast of air heated to some convenient amount such as about 200° F. A hose 81 supplies air for inflation before and during washing, and after washing heated air is supplied to pipe 71. After drying the container, the air is purged in any of several ways familiar to those in this art before nitrogen is supplied.

In Figs. 13 and 14 the ring 82 is adapted to extend around the clamping ring of the discharge opening in the bottom of the container. From this ring radial upwardly inclined bars 84 constitute supports for a filled container and these bars are capable of functioning for somewhat the same purpose as the cables in the sling suspension of Figs. 6, 7 and 9. This vibrating support does not need to begin its movement until around 90% of the container contents has been discharged. The upper portion of the container collapses as material is discharged when it settles down into the support. These bars engage the container above and outside the discharge opening and are capable of applying a squeezing action to the lower portion of the container walls. A motor 83 drives mechanism for vibrating the supporting bars 84 and container 10 with an amplitude of about 1 inch at a frequency of between 100 to 300 vibrations per minute. The container and supporting bars 84 during vibration are moved along the guide rails 85 and 86 shown at the top and bottom in Fig. 14.

A collapsed container as shown in Fig. 8 is preferably suspended from above and inflated with an inert gas such as nitrogen by attachment of the gas supply line 17 to the check valve fitting 23 shown in Fig. 5. This check valve is about an inch and a half inside diameter so that the inflating of the container may be accomplished in a relatively short interval. Upon inflation the pressure in the inflated container is quite low being only between about one and two pounds per square inch. It will be understood that if the collapsed container is in need of washing it will be placed over the washing fixture 13 in the manner described above before or after being inflated. Due to some of the inflating gas being absorbed and carried off by the wash water some gas may need to be supplied during washing. After being inflated and washed, if necessary, the cover 29 of the filling opening 16 is removed and the collapsed sleeve pulled outwardly from the filling opening. At this time no large quantity of gas leaks out because the draw string 33 is tied tight closing the gas-impervious sleeve against substantial leakage. The upper end of the sleeve is then placed around the fitting 19 at the lower end of the material filling line and held in substantially gas-tight connection with the outside of such filling line by either tying an upper draw string or by having the upper end of the sleeve held in gas-tight connection with the outside of the filling line by an expansible band 66 as shown in Fig. 11. After the upper end of the sleeve has been made to have a gas-tight connection with the filling line, lower draw string 33 is untied to release gas pressure within the container. Pressure in the filling line is prevented from going far by reason of the rotary feeder valve 21 to maintain the filling line 18 or 65 between this rotary feeder valve and the container under slightly superatmospheric pressure. During the filling operation inert gas is supplied gradually and continually or intermittently from time to time as needed to prevent air leaking into the container and lower filling line. The rotary feeder valve 21 is driven at a speed of about 56 R. P. M. in order to fill the container with approximately 11,000 pounds of granular polyethylene in about twenty minutes.

Stoppage of the supply of material to the container is effected in one or more of several ways. For example the material may be packed in the supply line 18 up to the rotary feeder valve 21 and cause this rotary valve to stop by jamming and in response to an overload circuit breaker going out and stopping the motor driving the feeder valve. Due to the container being slightly expansible, the container may be vibrated slightly by a kick or otherwise and the small fraction of about 1% of material in the lower end of the supply line will fall into the container. While the inside of the supply line is approximately 6 inches in diameter its cubical contents is less than 1% of the volume of the container and the container is adapted to be expanded about 4% both linearly and volumetrically. The result is that after a kick or other vibration of the filled container the material in the supply line below the rotary feeder valve is allowed to fall into the container on its being slightly vibrated and expanded. Another way in which the supply of material to the container is shut off automatically is in response to the level of granular material reaching the height of the resin disperser 57 shown in Fig. 10. There are preferably two vanes rotating at 1800 R. P. M. At that time the material jams and stops rotation of the distributor 57 and shaft 58 by a circuit breaker stopping the motor 60. The purpose of the rotating vanes 57 is to prevent the granular material piling up at the mouth of the container. Instead it causes incoming granules to be thrown outwardly to the periphery of the container. After the material rises to stop the disperser 57, the shaft 58 is raised to hold the vanes 57 in the dotted line position in Fig. 10. The draw string 33 is then tied to close the sleeve between the top of the container and the elevated vanes. After tying the draw string 33 the air pressure under the band 66 is released allowing the sleeve 32 to fall into the container when it will occupy the dotted line position shown in Fig. 4.

After filling, a crane or lifting truck will remove the filled container from the tilting cradle of Figs. 1 and 2 to either a storage yard or to a ship, barge, rail car, or motor truck. With containers of the size mentioned it is possible to get seven of them in alignment in an open rail car of the type having short sides and commonly known as a gondola car. Most industrial users of polyethylene will have or can justify obtaining a suitable lifting truck or a crane whereby the container can be handled in the described manner.

For emptying, the container is placed in the sling of Fig. 6 as described above. Upon removal of the cover from the discharge opening in the bottom of the container the same type sleeve shown and described in connection with the filling container is drawn out and gas-tightly secured to a discharge line. During emptying of the container the inert gas is not ordinarily supplied to the container because the residual amount there is discharged with the material, although gas may be supplied if desired. Instead of using the sling of Fig. 6 during the emptying of a container the vibrating support shown in Figs. 13 and 14 may hold the container and its contents, when the ring 82 extends around the discharge opening in the bottom of the container. The latter emptying apparatus is quicker than the sling of Fig. 6 which takes more time to place the container in the sling and remove it therefrom. The Fig. 6 construction is preferable where the container can displace the need for a storage bin and the rate of discharge is controlled by the rate of consumption.

It has been found desirable that the container 10 be free of natural rubber and have all its plies comprised of chemical rubber known as "neoprene." The tilting cradle shown in Figs. 1 and 2 may be vibrated as is the container support of Figs. 31 and 14 in order that during filling the material may be packed as tightly as is conveniently possible. The 86 inch diameter container will expand to a diameter of about 89 inches when filled with granular polyethylene and would expand to as large as 90 inches in diameter when filled with water. Other materials than polyethylene and the resins mentioned are adapted for shipment under the above described process of filling, transporting and emptying materials out of contact with the atmosphere.

Among the advantages of this invention may be mentioned the much desired greater freedom from contamination by the totally enclosed filling, transporting and emptying apparatus and system for solid materials. The explosive hazard is minimized. After the container has been collapsed the cover for the discharge opening is usually replaced and the residual inert gas or nitrogen is retained. Any air that may have leaked into the collapsed container will be in such small quantity that any diluted ethylene gas and oxygen present no explosive hazard on again inflating the container with nitrogen and filling it. A greatly reduced resin loss of nearly 1200% is possible. Reduction in such loss is an important factor in the present invention. With the large size containers mentioned above one such container is capable of replacing about 200 of the paper bags formerly used in the transportation of polyethylene. 40% to 50% of the shipping costs with paper bags is estimated to be saved. No elaborate handling equipment is needed by a user of the described filled container because nearly every such user has a lifting truck or crane by means of which the filled containers may be lifted out of a rail car and moved to the place where they are to be used. In shipping calcium chloride for example instead of nitrogen the container will be filled with dry air. The expansibility of the container is useful in enabling the material to be well packed herein. The use of two openings one for filling and one for discharge permits the filling and emptying of the container without the necessity of having more elaborate equipment to invert it. Preferably a fluid pressure regulator limits the gas pressure in the container to a maximum of seven or eight pounds per square inch. After being filled the pressure of inert gas in the container is usually raised to about five pounds per square inch. Any overload circuit breaker not only stops rotary feed valve 21 but also any and all conveyors 20 supplying material.

Features disclosed herein are claimed in my divisional application filed January 17, 1957, Serial No. 634,707.

What is claimed is:

1. A method of filling a collapsible container to prevent contamination of the container contents which comprises first inflating said container with gas under pressure through an opening separate from a filling opening, and while maintaining such inflation opening said filling opening, substantially gas-tightly sealing a filling connection in said filling opening, filling said container with material supplied through said connection while maintaining pressure in said container, removing said connection while maintaining gas pressure in said container, and sealing said container for shipment while supplying gas under pressure through said separate opening.

2. A process for filling a collapsible container with solid material out of contact with the atmosphere which comprises inflating said container with a gas inert to the material and to the container, removing a closure on a filling opening in said container while retaining a substantial portion of said gas pressure in said container, gas-tightly connecting a filling line with said container through said filling opening after removal of said closure and before a substantial quantity of air has become mixed with the inert gas in said container, after connection of said filling line supplying said inert gas under at least a slight superatmospheric pressure to said container and at least some of filling line, conserving the inert gas within said supply line by feeding material into said line through a rotary feeder valve, stopping the supply of material in response to the attainment of a predetermined quantity of material in said container, disconnecting said supply line, replacing the closure on said filling opening, and supplying more inert gas to said container after it has been closed.

3. A process according to claim 2 in which said material and gas are also discharged at least to some extent through an opening nearly opposite to the location where filled, by a squeezing of the flexible container.

4. A process for opening a container under at least slight superatmospheric pressure and moving material into or out of said container without losing a large quantity of said gas, which comprises injecting gas into said container, removing a closure from an opening in said container, retaining gas pressure within said container by means of a flexible substantially gas impervious sleeve closing said opening, withdrawing said sleeve from said container through said opening while one end portion thereof is substantially anchored to said container within said opening, gas-tightly securing said sleeve to a passageway, then opening said sleeve between said container and the place of gas tight attachment of the sleeve to said passageway for movement of material therethrough, moving material through said passageway and sleeve, stopping said movement of material, substantially gas-tightly closing said sleeve adjacent said container to retain gas pressure therein, disconnecting said sleeve from said passageway, and replacing said sleeve within the container and replacing said closure on said container opening.

5. A process of filling a container with granular material according to claim 4, which comprises inserting a rotatable vane and drive shaft therefor through said container opening adjacent the same after said sleeve has been connected to said passageway and after said sleeve has been opened to movement of material through said passageway, driving said vane and distributing material generally radially outwardly by said rotatable vane as the material enters the container, and stopping the supply of material to said container when a predetermined quantity thereof has been filled into said container.

6. A method of filling a container to reduce danger of contaminating the material being supplied from dust in the air which method comprises filling said container with inert gas until a large majority of its contents is such gas, removing a cover from a filling opening, retaining gas within the container after removal of said cover by means of a flexible sleeve having means adjacent said container for closing said sleeve, withdrawing said sleeve from the container, inserting a filling pipe into said sleeve, securing an outer end portion of said sleeve substantially gas-tightly around said filling pipe, opening said sleeve between said container and gas-tight connection with said filling pipe by releasing said closing means, filling said container through said filling pipe and sleeve while having gas pressure in said container, shutting off the supply of material when the container has received a desired amount of material, closing said sleeve between the filling pipe and container, removing said sleeve from around said filling pipe, inserting the sleeve within the container through said filling opening, and sealing said opening by said cover applied thereover.

7. An apparatus for filling a gas-tight collapsible shipping container comprising in combination means for supplying an inert gas to said container before, during, or after filling the same, a supply passageway for leading material into said container from above it, a rotary feeder valve in said supply passageway adjacent a container to be filled, means for moving said feeder valve, and means for stopping the feeder valve and the supply of material through said passageway in response to the filling of said container with a predetermined quantity of material.

8. Apparatus according to claim 7 in combination with means for agitating at least some of the material in a container while said supply passageway is connected thereto.

9. The combination with a collapsible shipping container, of means to assist in filling the container while substantially gas-tightly sealed from the atmosphere and connected with a filling pipe having a lower end spaced above said container, a flexible substantially gas-impervious sleeve gas-tightly connected to said pipe and container, a rotatable vane within said container and supported by a shaft passing through said sleeve and at least a lower end portion of said pipe, a motor for driving said rotatable vane and its supporting shaft, and an overload circuit breaker for stopping said motor when material being supplied to said container reaches a level in the bag high enough to impede movement of said vane.

10. Apparatus according to claim 9 in which at least a portion of said shaft and vane are movable to withdraw said vane from said container.

11. The combination of means for inflating a collapsible container with gas under at least some superatmospheric pressure, means for retaining gas pressure within said container when a gas sealing cover on a filling opening in the container has been removed, means for gas-tightly connecting a supply pipe for material to said container, means for holding superatmospheric pressure in said container and in at least a portion of a supply pipe whereby such pressure may be supplied to said container and at least a portion of a supply pipe for material during the filling of said container with material, said gas retaining means being also adapted to retain superatmospheric pressure in said container after it has been disconnected from said supply pipe for material, and means for supplying gas under pressure to said container after a gas sealing cover has been attached over a material filling opening.

12. Method of handling containers for material that assures complete isolation of such material from contamination, which comprises closing a flexible sleeve that is connected to such container about an opening in such container so that such opening is essentially gas tight, leaving free the outer end portion of such sleeve, supplying gas under pressure to such container, connecting such outer end portion of said sleeve to a pipe for conducting material with respect to said container, releasing such sleeve so that a passage is provided therein between the interior of said container and pipe, passing material through such passage, reclosing said sleeve to close such passage and essentially seal such opening, and disconnecting the end portion of said sleeve from said pipe.

13. Method of filling a collapsible container with granular solid material that assures complete isolation of such material from contamination, which comprises closing a flexible sleeve that is connected to such container about an inlet in such container so that such inlet is essentially gas tight, leaving the outer end portion thereof free, inflating such container with gas, connecting such outer end portion of such sleeve to a pipe for supplying granular solid material to said container with a connection that is essentially gas tight, releasing such sleeve so that an opening is provided through such sleeve between the inside of said pipe and the inside of said container, filling the container with such material through such opening, reclosing such sleeve to seal such opening, and disconnecting said sleeve from said pipe, whereby isolation of such material is accomplished during such filling operation.

References Cited in the file of this patent

UNITED STATES PATENTS

| | | |
|---|---|---|
| 1,590,580 | Hume | June 29, 1926 |
| 1,863,775 | Ward | June 21, 1932 |
| 2,063,652 | Woodruff | Dec. 8, 1936 |
| 2,104,930 | Mackintosh | Jan. 11, 1938 |
| 2,246,497 | Beck | June 24, 1941 |
| 2,258,215 | Paulson et al. | Oct. 7, 1941 |
| 2,523,716 | Parr | Sept. 26, 1950 |
| 2,564,163 | Leperre | Aug. 14, 1951 |
| 2,612,924 | Cunningham | Oct. 7, 1952 |
| 2,662,042 | Dougherty et al. | Dec. 8, 1953 |
| 2,677,406 | Cunningham | May 4, 1954 |
| 2,690,850 | Welker | Oct. 5, 1954 |